Dec. 24, 1968 G. E. CLAUSSEN 3,418,446
ELECTRIC ARC WELDING ELECTRODES AND PROCESS
Filed March 25, 1966
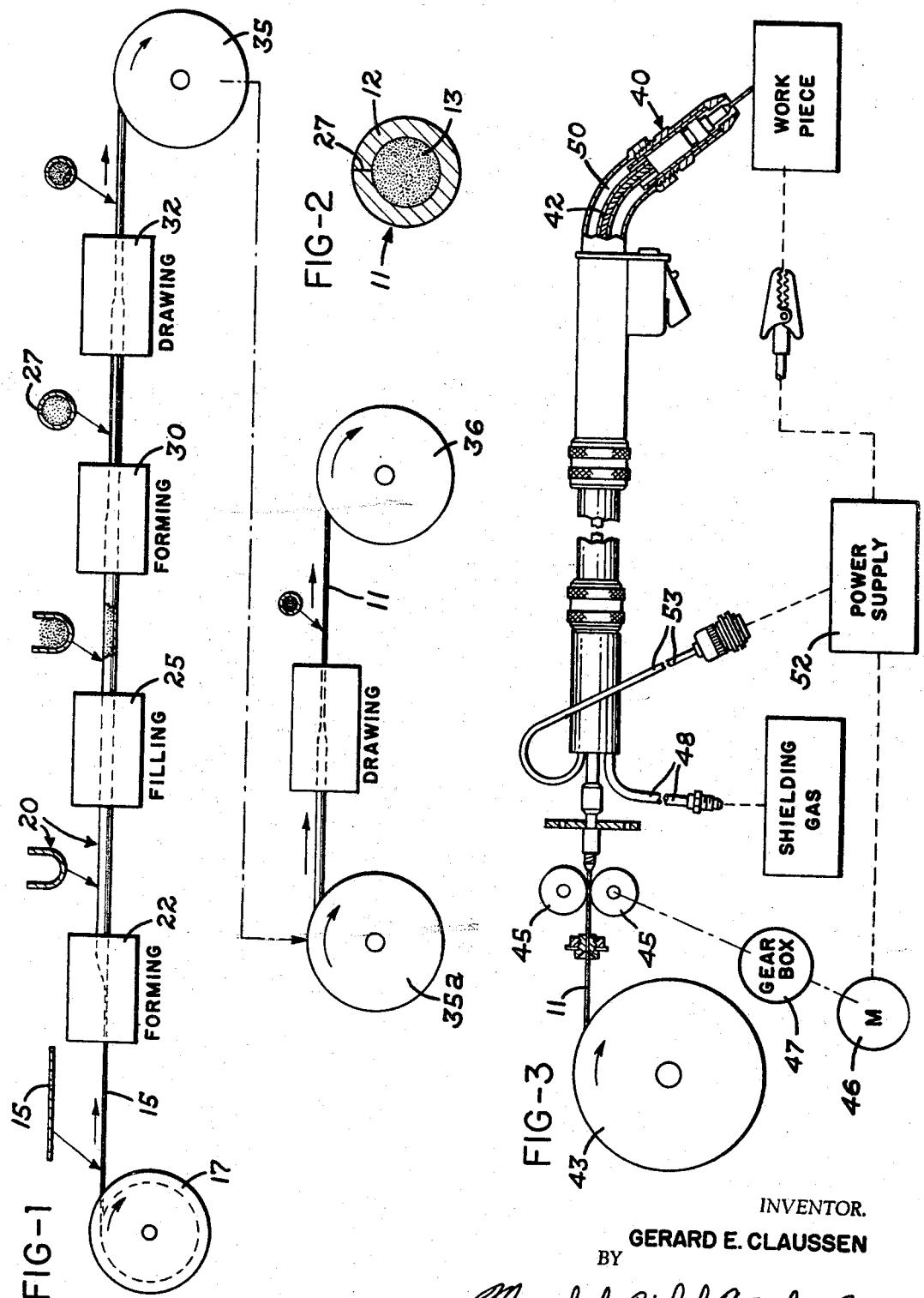
INVENTOR.
GERARD E. CLAUSSEN
BY
Marechal, Biebel, French & Bugg
ATTORNEYS United States Patent Office 3,418,446
Patented Dec. 24, 1968

3,418,446
ELECTRIC ARC WELDING ELECTRODES
AND PROCESS
Gerard E. Claussen, Troy, Ohio, assignor to Hobart
Brothers Company, Troy, Ohio, a corporation of
Ohio
Filed Mar. 25, 1966, Ser. No. 537,502
9 Claims. (Cl. 219—130)

ABSTRACT OF THE DISCLOSURE

A method of inert gas shielded open arc welding includes the use of a flux cored electrode. The electrode sheath contains 0.08% carbon, 0.45% manganese, 0.02% phosphorous, 0.02% sulphur, and 0.01% silicon. The flux core includes by weight proportion of the total flux: 55% rutile; 14% ferrosilicon; 16% hydrogen reduced manganese containing by chemical analysis, 99% manganese, a maximum of 0.0007% hydrogen, a maximum of 0.016% sulfide, and a maximum of 0.005% sulfate; and 15% magnetite. Alternatively, the manganese constituent is obtained from ferromanganese. Where it is desired to increase the viscosity of the weld metal, silica sand is included in the core.

---

This invention relates to improved continuous electrodes which are used in the process of gas shielded arc welding of low carbon and low alloy steels, and to related novel processes of electric arc welding.

In relation to the welding of low carbon and low alloy steels, various electrodes have been provided in the past, and various processes have been proposed, whereby satisfactory welds can be obtained without the need for additional slag forming or other ingredients beyond what is available in the electrode itself. Coated electrodes (ordinarily in the form of "stick" electrodes) are generally considered unsatisfactory for continuous welding processes since the coatings are usually somewhat brittle and tend to crack if the electrode is coiled, which it must be if a substantial length is to be used, and since the automatic feeding equipment tends to break the coating in any event. Because of this, slag forming and other ingredients are incorporated in a core for successful continuous electrode materials, the electrode being formed as a hollow sheath which is normally constructed by "rolling" a metallic strip, and the hollow or core of the thus formed tube or sheath is filled with the required fluxing and other ingredients.

One suggestion known in the prior art is the use of pre-fused ingredients forming a synthesized slag in the core material which is reduced (chemically) to the point where the material in the core contains less than its normal amount of oxygen and will tend to absorb or combine with oxygen during welding. Another suggestion has been made that the amount of core material in a continuous cored electrode of this nature should be present in an amount of about one-fourth to one-fifth (minimum) of the total weight of the electrode. This is also expressed sometimes as a percentage of the weight of the metallic portion of the electrode, in which case the percentages have been expressed in terms of approximately two-fifths to one-fourth of the weight of the metallic sheath, preference being indicated to a core which weighs more than one-third of the weight of the metallic sheath.

Obviously, it is desirable for economic reasons to minimize the number of operations and the amount of labor which is involved in manufacturing the continuous electrode. The business is competitive, and any savings in this regard are important. At the same time, for any given length of electrode it is desirable to have as much metal available as possible, since it is the sheath which is the basic source of weld metal, the core ingredients being for the most part used to form protective slag, which does not become a physical part of the weld. The greater weight of metal available per unit length of the electrode, the greater will be the deposit of weld metal, and hence the greater will be the efficiency of the welding process.

Also, consideration should be given to the fact that in the final analysis it is the end portion of the continuous electrode through which the arc welding current passes. When there is less metal and more core material, electrical resistance is higher and more power is required to maintain a given welding current. This again reflects on the efficiency of the process.

There are other economic factors in the process of manufacturing continuous cored electrodes which must be taken into consideration. Generally speaking, a continuous flat metal strip is formed to a "channel" shape and the core material is added, after which the strip is formed to encompass the core material, with preference being given to a butt joint between the edges of the strip. Other types of joints tend to leave a rough edge which can scratch the drawing dies when the electrode, with the core material enclosed, is drawn to a desired smaller diameter. In this forming process, it has been found that if a fairly large metallic strip is used (with respect to the ultimate circumference of electrode desired) the core aperture will in turn be fairly large and this core can be filled more accurately, to a closer tolerance, than is possible if a smaller strip is initially used with a consequently smaller core opening. If more material is deposited per lineal inch of strip in the initial filling, a slight variance in the amount of material deposited will result, percentagewise, in a much smaller error than would result if the same variance occurred in filling a much smaller core aperture.

Once the strip has been filled and the butt joint formed, then the electrode is drawn to the desired diameter. In a typical operation this may result in a reduction in outside diameter in excess of 75%. It has been discovered that in this process the wall thickness of the sheath decreases as the diameter decreases, remaining in about the same proportion. The core size decreases proportionately, and the core material elongates, but does not compact appreciably. However, the particle size of the original core material, as placed in the formed strip, does have some bearing on the ultimate density of the core material in the finished electrode.

It is desirable that the core be essentially filled at the time the butt joint is formed. At this time the ratio, by weight, of core material to the total electrode is established, because if the core material is sufficiently dense to resist collapse of the sheath during subsequent drawing, then the metal of the sheath and the core material will elongate by essentially the same amount. If, on the other hand, the core is not filled, then the sheath will tend to collapse into the void as it is drawn, and the core material will not spread proportionately. Thus the weight ratio of core material to the total electrode could be changed in drawing.

By controlling the amount and particle size of core ingredients, the present invention achieves a full core when initially formed, with an optimum amount of core material, including a minimum of naturally available ingredients, to form enough slag and enough deoxidizer during welding to achieve the desired result, and in addition to provide enough manganese to replace any manganese that may be lost from the work material due to the action of the arc and the high temperatures involved.

Accordingly, a principal object of the present invention is to provide an improved welding electrode having core material made up of natural products which are employed in a minimum optimum amount, and being capable of achieving a good weld in low carbon and low alloy steels.

Another object of the invention is to provide such an improved continuous cored electrode wherein an amount of iron oxide is employed in the core material, and may be varied somewhat in accordance with the type of steel to be welded, and wherein the amount of silicon present in the core material is accordingly varied by a predetermined related amount.

Another object of the invention is to provide an improved continuous cored electrode for use in gas shielded arc welding processes, and to provide such a process of welding, wherein an optimum amount (preferably about 16% by weight of the electrode) of inexpensive core material is employed, thereby providing an efficient process with maximum possible deposition rate of weld metal.

Another object of the invention is to provide an improved continuous cored electrode for use in gas shielding arc welding, wherein the electrode contains a minimum and optimum amount of slag forming materials which are natural products, and which can be simply prepared and placed in the metallic sheath during the manufacturing of the electrode.

A further object is to provide a novel process of manufacturing continuous cored electrode for use in arc welding.

Other objects and advantages of the invention will be apparent from the following description, the accompanying drawings and the appended claims.

In the drawings—

FIG. 1 is a schematic flow type diagram illustrating the steps in the manufacture of continuous cored electrode such as provided by the invention.

FIG. 2 is an enlarged cross-sectional view through a cored electrode such as provided by the invention; and FIG. 3 is a somewhat schematic diagram showing the manner in which the cored electrode is employed in a gas shielded arc welding process.

Referring to the drawings, which shows a preferred embodiment of the invention, the cored electrode 11 shown in FIG. 2 includes a tubular sheath 12 which encloses a core 13. The sheath 12 is formed from a metal strip 15 having a width of about 0.514 inch and a thickness of about 0.042 inch. A typical chemical composition of a mild steel strip, which has proven quite satisfactory, is 0.08% carbon, 0.45% manganese, 0.02% phosphorus, 0.02% sulfur, and 0.01% silicon.

The strip 15 is taken from a supply spool 17 and shaped into an upwardly open channel, as indicated generally at 20, by conventional forming equipment 22 which is shown in block form. The strip of sheath material then passes through a filling station 25 where the granular core material is placed in the open top formed strip as it moves through this station.

The quantity of core material placed in the strip and the composition of this material is discussed in detail later herein. The bulk, or volume occupied, by the core material is predetermined to equal the volume enclosed by the sheath strip when it is formed to a butt joint 27 (preferred) at the next forming station 30. Thus, at this stage the interior of the tubular sheath is in contact with the core material around its entire periphery, and the core material is completely enclosed.

The completely formed electrode is next passed through a conventional drawing station 32 where it is pulled through a die or the like to a smaller diameter. With the core material completely filling the interior of the sheath, there is adequate resistance to collapse of the sheath at any localized point during this operation, thus the metal sheath elongates, with its diameter and wall thickness reducing proportionately, and at the same time the core material spreads evenly and continues to fill the sheath.

The electrode may be further drawn, either in the same continuous operation, or in separate drawing operations. The latter arrangement is shown, with the electrode from drawing station 32 passing to a take-up reel 35. These reels can then be transferred (as at 35a) to other drawing apparatus where the electrode is reduced in size again, one or more times, until the ultimate desired size is achieved and the finished electrode is wound on a further reel 36. The electrode is then supplied to the consumer in coils formed in this manner and is employed in a continuous arc welding process, as later described.

It has been found that a preferred composition of the core material consists of the following ingredients, expressed in percent by weight of the core material: manganese 16.0%, ferrosilicon 14.0%, rutile 55.0%, magnetite 15.0%. These materials should be supplied in granular form, and it is desirable that the particle size of certain of the materials be within certain limits. The reason for this is that the optimum percentage by weight of core material has been established as being 16% (±1%) by weight of the total weight of the electrode. In order to obtain this relationship in the finished electrode it has been found that the particles of the material as deposited in the filling station 25 must be of such size that the density of the core material mixture is sufficient to fill all the available core area within the sheath, while still providing this preferred percentage by weight of core material. Therefore, the following specifications have been established for the materials used in the core.

The manganese used is of hydrogen reduced grade, and should contain, by chemical analysis, a minimum of 99% manganese, a maximum of 0.0007% hydrogen, a maximum of 0.016% sulfide, and a maximum of 0.005% sulfate. The particle size should be such that all particles will pass through a 50-mesh screen, all but 1% will pass a 60-mesh screen and no more than 35% will pass a 325-mesh screen.

The ferrosilicon should be a 50% grade having a guaranteed chemical analysis of 48% minimum silicon, 0.12% maximum carbon, 0.04% maximum phosphorus, and 0.2% maximum sulphur. The particle size should be such that all particles will pass a 40-mesh screen and no more than 0.5% will pass on a 50-mesh screen, and no more than 20% will pass a 325-mesh screen.

The rutile is provided in granular form, and should contain a minimum of 92% $TiO_2$, and a maximum of 0.008% phosphorus.

The magnetite used is known commercially as black iron oxide, having a chemical analysis as follows:

| | Percent |
|---|---|
| FeO and $Fe_2O_3$ | 94.6 |
| Total Fe | 68.37 |
| Sulphur | 0.03 |
| Alumina | 0.8 |
| Silica | 2.48 |
| Vanadic oxide | 0.64 |
| Manganese oxide | 0.1 |
| Titania | 0.26 |
| Alkaline earths | 1.8 |

The particles of the magnetite should be such that all particles will pass a 48-mesh screen, no more than 1% will not pass a 50-mesh screen, and no more than 25% will pass a 200-mesh screen.

With the core material consisting of these ingredients in the previously described percentages by weight, electrodes have been manufactured and used in welding processes with several different shielding gases, including (1) carbon dioxide, (2) a mixture of 25% carbon dioxide and 75% argon, and (3) argon plus 5% oxygen.

The tensile and Charpy V impact properties of the weld metal deposited with this electrode using 28 volts, 420 amperes, and 40 cubic feet of gas per hour were as follows:

|  | $CO_2$ | 75% Argon, 25% $CO_2$ | Argon plus 5% Oxygen |
|---|---|---|---|
| Yield Point, p.s.i. | 67,000 | 64,000 | 66,500 |
| Tensile Strength, p.s.i. | 78,000 | 75,500 | 79,000 |
| Elongation, percent in 2″ | 28 | 25 | 28 |
| Reduction of Area, percent | 61 | 58 | 59 |
| Charpy V impact, ft.-lb.: |  |  |  |
| Plus 70° F | 58 | 66 | 49 |
| 0° F | 23 | 30 | 26 |

In order to increase the viscosity of the weld metal it has been found desirable to add a small amount of silica sand to the core ingredients, and in such instance a preferred composition of core material is, in percent by weight of the entire core; rutile 55.5% manganese 22.5%, ferrosilicon 7%, magnetite 7.5% and silica sand 7.5%. The same specifications apply as previously given for the chemical analysis and/or particle size of the granular core material, the silica sand being merely washed natural silica sand.

The tensile and Charpy V impact properties of the weld metal deposited with this electrode, using 28 volts and 420 amperes, with 40 cubic feet of gas per hour, are as follows:

|  | $CO_2$ | 75% Argon, 25% $CO_2$ | Argon plus 5% Oxygen |
|---|---|---|---|
| Yield Point, p.s.i. | 69,000 | 71,000 | 69,000 |
| Tensile Strength, p.s.i. | 81,000 | 81,000 | 83,000 |
| Elongation, percent in 2″ | 29 | 26 | 28 |
| Reduction of Area, percent | 65 | 56 | 56 |
| Charpy V impact, ft.-lb.: |  |  |  |
| Plus 70° F | 64 | 58 | 66 |
| 0° F | 25 | 29 | 24 |

In some instances it may be desirable to obtain the manganese from ferromanganese, rather than using the metallic manganese itself. In such instances ferromanganese may be substituted for the manganese metal, and the ingredients of the core material are as follows:

|  | Percent by weight of the total core |
|---|---|
| Rutile | 52.5 |
| Ferrosilicon | 7.5 |
| Ferromanganese | 22.5 |
| Magnetite | 7.5 |
| Silica sand | 10.0 |

The foregoing, therefore, constitute novel and inexpensive cored electrode materials which have been found particularly suitable for use in the welding of plain carbon and low alloy steels, using a gas shield. The process of welding is illustrated schematically in FIG. 3, wherein a suitable torch 40, such as the type shown in U.S. Patent No. 3,112,392, is provided for semi-automatic welding. The electrode is supplied through an internal conduit 42 from a supply reel 43, being fed by feed rollers 45 which are driven by a suitable motor 46, preferably an adjustable speed motor, which is connected to the feed rolls through a gear box 47. Shielding gas is supplied to the tube 48 which constitutes part of the torch, and which conducts the gas into the annular passage 50 within the torch 40 to cause the gas to flow through the head of the torch around the electrode. A suitable welding power supply 52, which may be either AC or DC, is connected through the welding power supply cable 53 leading to a contact shoe (not shown) in the torch where contact is maintained with the sheath of the electrode as it is fed through the head of the torch toward the workpiece.

The welding process is of the open arc type, in the sense that there is no separately supplied fluxing material as in submerged arc welding. The shielding gas continuously surrounds the arc, and prevents undesired oxidation reactions in the molten weld metal. The ingredients of the core material, particularly the rutile, function to provide adequate slag to protect the weld metal as it solidifies and the torch is advanced. The manganese and the silicon (derived from the ferrosilicon) function as deoxidizers and tend to prevent porosity in the weld metal, and also contribute to the strength of the weld metal. Products of deoxidation during the welding process, namely the oxides of manganese and silicon, dissolve in the slag. The magnetite, which is primarily a source of iron oxide, functions chiefly to control spatter.

It has been found that the percentage of manganese and silicon in the core ingredients depends to some extent upon the intended use of the electrode. A somewhat lower percentage of these ingredients may be used when welding, for example, clean grooves in killed steel plate, where a slightly higher percentage of these ingredients is desirable when welding rusty rimmed steel, or when it is desired to produce a higher strength weld metal. The ratio of iron oxide to silicon should, in any event, be maintained such that if the percentage of iron oxide is increased, silicon should be increased according to the following equations:

$$2FeO + Si = 2Fe + SiO_2$$
$$Fe_3O_4 + 2Si = 3Fe + 2SiO_2$$
$$2Fe_2O_3 + 3Si = 4Fe + 3SiO_2$$

The present invention, therefore, provides novel relatively inexpensive and simple to manufacture cored electrodes for gas shielded arc welding. The core material, and the ingredients thereof are provided as disclosed herein in an optimum amount and in such form during manufacture of the continuous electrode that the amount of metal in the electrode, which is available to form weld metal, is kept as high as feasible while still producing welds of good quality and proper strength.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in appended claims.

What is claimed is:,

1. A continuous cored electrode for use in gas shielded continuous arc welding comprising a hollow steel sheath member constituting at least 72–75% by weight of the total weight of the electrode, and granular material filling said hollow sheath member and including the following ingredients; rutile, ferrosilicon, manganese and magnetite, said ingredients being present in the following amounts:

|  | Percent by weight of the total core |
|---|---|
| Rutile | 55 |
| Ferrosilicon | 14 |
| Source of manganese | 16 |
| Magnetite | 15 |

2. A continuous cored electrode as defined in claim 1, wherein the said ingredients of the core material are present as crushed granular rutile; ferrosilicon, all through 40 mesh, 0.5% maximum on 50 mesh; 20% maximum through 325 mesh; manganese, all through 50 mesh, 1% maximum on 60 mesh, 35% maximum through 325 mesh; and magnetite, all through 48 mesh 1% maximum on +50 mesh; 25% maximum through 200 mesh.

3. A continuous cored electrode as defined in claim 1, wherein the rutile contains a minimum of 92% $TiO_2$, the ferrosilicon contains a minimum of 48% Si, the source of manganese contains a minimum of 99% manganese, and the magnetite contains 68.37% total Fe.

4. A continuous cored electrode for use in gas shielded continuous arc welding comprising a hollow steel sheath member constituting at least 72–75% by weight of the electrode, and granular material filling said hollow sheath member including the following ingredients:

| | Percent by weight of the total core |
|---|---|
| Rutile | 55.5 |
| Ferrosilicon | 7.0 |
| Source of manganese | 22.5 |
| Magnetite | 7.5 |
| Silica sand | 7.5 |

5. A continuous cored electrode for use in gas shielded continuous arc welding comprising a hollow steel sheath member constituting at least 72–75% by weight of the electrode, and granular material filling said hollow sheath member including the following ingredients:

| | Percent by weight of the total core |
|---|---|
| Rutile | 52.5 |
| Ferrosilicon | 7.5 |
| Ferromanganese | 22.5 |
| Magnetite | 7.5 |
| Silica sand | 10.0 |

6. A continuous cored electrode as defined in claim 1, wherein said sheath member is a mild steel containing 0.08% carbon, 0.45% manganese, 0.02% phosphorus, 0.02% sulphur, and 0.01% silicon.

7. The process of arc welding with a visible arc and a shielding gas, comprising feeding a consumable cored electrode toward a workpiece, said electrode having a hollow steel sheath constituting approximately 72–75% by weight of the total weight of the electrode and having a granular material filling the interior of the sheath and including the following ingredients:

| | Percent by weight of the total core |
|---|---|
| Rutile | 55 |
| Ferrosilicon | 14 |
| Source of manganese | 16 |
| Magnetite | 15 | establishing and maintaining an electric welding arc between the end of the electrode and the workpiece, causing relative movement between the electrode and workpiece along a path of weld and simultaneously advancing the electrode as it is consumed at the weld to maintain a molten weld area in which a protective slag is formed from said electrode core ingredients, and surrounding the arc and molten weld area with a flow of shielding gas.

8. The process of arc welding with a visible arc and a shielding gas, comprising feeding a consumable cored electrode toward a workpiece, said electrode having a hollow steel sheath constituting approximately 72–75% by weight of the total weight of the electrode and having a granular material filling the interior of the sheath and including the following ingredients:

| | Percent by weight of the total core |
|---|---|
| Rutile | 55.5 |
| Ferrosilicon | 7.0 |
| Source of manganese | 22.5 |
| Magnetite | 7.5 |
| Silica sand | 7.5 | establishing and maintaining an electric welding arc between the end of the electrode and workpiece, causing relative movement between the electrode and workpiece along a path of weld and simultaneously advancing the electrode as it is consumed at the weld to maintain a molten weld area in which a protective slag is formed from said electrode core ingredients, and surrounding the arc and molten weld area with a flow of shielding gas.

9. The process of arc welding with a visible arc and a shielding gas, comprising feeding a consumable cored electrode toward a workpiece, said electrode having a hollow steel sheath constituting approximately 72–75% by weight of the total weight of the electrode and having a granular material filling the interior of the sheath and including the following ingredients,

| | Percent by weight of the total core |
|---|---|
| Rutile | 52.5 |
| Ferrosilicon | 7.5 |
| Ferromanganese | 22.5 |
| Magnetite | 7.5 |
| Silica sand | 10.0 | establishing and maintaining an electric welding arc between the end of the electrode and workpiece, causing relative movement between the electrode and workpiece along a path of weld and simultaneously advancing the electrode as it is consumed at the weld to maintain a molten weld area in which a protective slag is formed from said electrode core ingredients, and surrounding the arc and molten weld area with a flow of shielding gas.

References Cited

UNITED STATES PATENTS 3,160,732  12/1964  Gamberg _____ 219—146 X

FOREIGN PATENTS 871,143  6/1961  Great Britain.

RICHARD M. WOOD, *Primary Examiner.*

J. G. SMITH, *Assistant Examiner.*

U.S. Cl. X.R.

219—146, 74